US00RE45846E

(19) United States
(12) Reissued Patent
Yuyama et al.

(10) Patent Number: US RE45,846 E
(45) **Date of Reissued Patent: *Jan. 19, 2016**

(54) METHOD ADJUSTING TENSION APPLIED TO SHEET, AND DEVICE FOR THE SAME

(71) Applicant: YUYAMA MFG Co., LTD, Toyonaka-shi (JP)

(72) Inventors: Shoji Yuyama, Toyonaka (JP); Hiroshi Nose, Toyonaka (JP); Itsuo Yasunaga, Toyonaka (JP); Naomichi Etou, Toyonaka (JP); Hirokazu Amano, Toyonaka (JP)

(73) Assignee: Kabushiki Kaisha Yuyama Seisakusho, Toyonaka-shi (JP)

( * ) Notice: This patent is subject to a terminal disclaimer.

(21) Appl. No.: 13/670,338

(22) Filed: Nov. 6, 2012

Related U.S. Patent Documents

Reissue of:
(64) Patent No.: 6,286,780
Issued: Sep. 11, 2001
Appl. No.: 09/533,436
Filed: Mar. 23, 2000

U.S. Applications:
(60) Continuation of application No. 10/659,681, filed on Sep. 11, 2003, which is an application for the reissue of Pat. No. 6,286,780, which is a division of application No.

(Continued)

(30) Foreign Application Priority Data

Sep. 20, 1996 (JP) ..... 8-250492
Sep. 19, 1997 (JP) ..... 9-254891
Sep. 22, 1997 (JP) ..... 9-257175

(51) Int. Cl.
*B65H 16/04* (2006.01)
*B65H 23/08* (2006.01)
*B65H 23/06* (2006.01)

(52) U.S. Cl.
CPC ..... *B65H 23/063* (2013.01)

(58) Field of Classification Search
USPC ..... 242/563, 563.2, 597.1, 597.2, 611, 534, 242/534.2, 421.1, 421.2, 421.4, 420.5, 242/597.6, 333.7, 334.3, 334.4
See application file for complete search history.

(56) References Cited

U.S. PATENT DOCUMENTS 3,257,086 A 6/1966 Drenning
3,898,436 A 8/1975 Pottebaum et al.

(Continued)

FOREIGN PATENT DOCUMENTS

DE 41 30 679 3/1993
EP 0 608 785 8/1994

(Continued)

*Primary Examiner* — William A Rivera
(74) *Attorney, Agent, or Firm* — Masuvalley & Partners

(57) ABSTRACT

To prevent disalignment of the edges of a folded sheet by smoothly feeding the sheet to a packaging unit while keeping tension fluctuations to a minimum when the sheet is unwound from a paper roll set in a paper feed unit even though the paper roll diameter decreases gradually as the sheet is unwound. A sheet length measuring sensor or rotary encoder is provided in the paper feed path through which the packaging sheet is fed toward the packaging unit. An angle sensor is provided which includes Hall element sensors provided on a support shaft and magnets provided on a core pipe of the paper roll. Any change in the signals from one of these sensors relative to the signal from the other sensor is used to calculate the paper roll winding length, and the sheet tension is adjusted to an optimum, constant level by controlling the sheet braking force stepwise according to the roll diameter measured by the sensors.

6 Claims, 13 Drawing Sheets

Related U.S. Application Data

09/315,045, filed on May 20, 1999, now Pat. No. 6,301,862, which is a division of application No. 09/111,477, filed on Jul. 8, 1998, now Pat. No. 5,967, 445, and a continuation-in-part of application No. 08/927,320, filed on Sep. 11, 1997, now abandoned.

(56) References Cited

U.S. PATENT DOCUMENTS

| | | | | |
|---|---|---|---|---|
| 4,097,726 | A * | 6/1978 | Satoh et al. | 242/534.2 |
| 4,199,118 | A | 4/1980 | Tetro et al. | |
| 4,286,757 | A | 9/1981 | Wirth | |
| 5,469,869 | A | 11/1995 | Suzuki et al. | |
| 5,503,349 | A | 4/1996 | Chertok | 242/422.2 |
| 6,059,222 | A * | 5/2000 | Yuyama et al. | 242/563 |

FOREIGN PATENT DOCUMENTS

| | | |
|---|---|---|
| JP | 61-211263 | 9/1986 |
| JP | 63-060857 | 3/1988 |
| JP | 1-166818 | 6/1989 |
| JP | 1-266916 | 10/1989 |
| JP | 3-198916 | 8/1991 |
| JP | 4-135546 | 12/1992 |
| JP | 5-338883 | 12/1993 |

* cited by examiner

METHOD ADJUSTING TENSION APPLIED TO SHEET, AND DEVICE FOR THE SAME

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

This *application is a continuation of Ser. No. 10/659,681, filed Sep. 11, 2003, which is a reissue of U.S. Pat. No. 6,286, 780, issued Sep. 11, 2001, which is* a divisional application of Ser. No. 09/315,045, filed May 20, 1999, which is divisional application of Ser. No. 09/111,477, filed Jul. 8, 1998, now U.S. Pat. No. 5,967,445, which is a continuation-in-part (CIP) of Ser. No. 08/927,320, filed Sep. 11, 1997, now abandoned.

BACKGROUND OF THE INVENTION

This invention relates to a method of adjusting the tension applied to a sheet, more particularly a method of adjusting the tension applied to a sheet pulled out of a sheet roll in a stepwise manner according to the changing diameter of the sheet roll, and a device for carrying out the method.

One conventional drug packaging device includes a sheet feed unit rotatably supporting a rolled sheet of heat-fusible packaging paper, and a sealing device provided in a feed path through which the packaging sheet is unwound and fed. Upstream of the sealing device, the sheet is folded in half, drugs are supplied, and the sheet is heat-sealed in the width direction and along the edges by the sealing device to seal the drugs.

When the packaging sheet runs out, a new paper roll is set in the paper feed unit, and the new sheet is unwound and fed. When the sheet is fed, it has to be tensioned uniformly so that the sealing position will not deviate due to inaccurate folding of the sheet. But actually, the tension applied to the sheet changes gradually because the diameter of the paper roll changes gradually as the sheet is unwound.

Examined Japanese utility model publication discloses a sheet tension adjusting device which can apply uniform tension to the sheet even when the diameter of the sheet roll changes. The sheet tension adjusting device disclosed in this publication has a roll support cylinder on which is detachably mounted a sheet roll. A plurality of roll diameter detection sensors are provided at the side of the sheet roll. Signals from these detection sensors are used to control the electromagnetic force produced by an electromagnetic brake provided in the roll support cylinder so that the braking force decreases stepwise as the roll diameter decreases.

With this conventional sheet tension adjusting device, the sheet length of the sheet, which changes as the sheet is unwound, is detected stepwise by the roll diameter sensors arranged in the diametric direction of the roll. Thus, when the roll diameter decreases to a point where the detection sensor rank changes, the braking force rank of the electromagnetic brake will fluctuate up and down for every rotation due to deviation of the axis of the core shaft, the weight of the sheet, or winding strain.

If this happens, the sheet edges cannot be aligned accurately when the sheet is folded in half. Complete packaging is thus impossible. Since the braking force rank changes sharply, the sheet may suffer a laceration in the width direction.

Light reflecting type detection sensors have a problem in that they are more likely to malfunction. Packaging sheets used for a drug packaging device include semitransparent, or transparent heat-fusible paper and many other kinds of paper. If the end position of such a sheet changes, light is reflected differently, making it impossible to detect the reflected light as a signal. This deteriorates detecting accuracy. Further, it tends to meander under the influence of humidity variations. Detection accuracy may deteriorate due to uneven end faces.

A thermal printer is usually provided upstream of the position where the sheet is folded in half for printing the packaging sheet. If the sheet vibrates, its printing dots may chip, or the durability of a remainder indicator lamp may deteriorate.

An object of this invention is to provide a method and a device of adjusting the tension in a sheet which is free of the problems of a associated with conventional methods of adjusting the tension in a sheet.

SUMMARY OF THE INVENTION

According to this invention, there is provided a method of adjusting the tension in a sheet comprising bringing a braking means into engagement with a roll support cylinder rotatably mounted around a nonrotatably supported support shaft, measuring the length of a sheet being fed from a roll of paper mounted on the roll support cylinder with a sheet length measuring sensor, calculating the winding length of the roll of paper after the sheet has been fed by subtracting the sheet length measured by the sheet length measuring sensor from a prestored maximum sheet length of the roll, calculating the current diameter of the roll based on the winding length of the roll and the thickness of the sheet, and adjusting the tension in the sheet by controlling the braking force of the brake means in a stepwise manner according to the current diameter of the roll.

The sheet length measuring sensor may be a sheet feed length detection sensor provided in a sheet feed path, or an angle sensor provided on the roll support cylinder for determining the sheet feed length based on the rotation angle of the roll support cylinder.

There is also provided a method of adjusting the tension in a sheet comprising bringing a braking means into engagement with a roll support cylinder rotatably mounted around a nonrotatably supported support shaft, detecting the length of a sheet being fed from a roll of paper mounted on the roll support cylinder with a sheet length measuring sensor, detecting the rotation angle of the roll support cylinder with an angle sensor, calculating the current paper length of the roll based on the sheet length or the rotation angle measured by either sensor, and adjusting the tension in the sheet by controlling the braking force of the brake means in a stepwise manner according to the diameter of the roll corresponding to the current paper length of the roll.

In the first method, the sheet length is measured by a single sheet length measuring sensor. Thus, in this method, it is essential that the full sheet length of the paper roll be known. This length is thus stored in a memory, and the current roll length is calculated by substracting the sheet feed length from the full roll length stored in the memory.

Such a full roll length does not necessarily have to be an actually measured value but may be approximately calculated based on the roll diameter and the sheet thickness. Such an approximately calculated value is sufficient to adjust the sheet tension because the braking force is adjusted roughly in a stepwise manner according to the changing diameter of the paper roll. Thus, even if the full roll length is not the full length of an intended end product, for example, even if the roll has been half used, it is possible to calculate the current roll length if the full roll length and diameter are known.

Based on the thus determined current roll length and the sheet thickness, the current roll diameter is calculated. The current roll diameter thus obtained is used to adjust the sheet tension by selecting an optimum brake force in a stepwise manner.

In the third method, signals are detected by the sheet length measuring sensor and the angle sensor. Based on the change in one signal relative to the other, a change in the roll length is directly measured.

By correlating a predetermined range of change in roll length with a change in the roll diameter beforehand, it is possible to select a stepwise control level of the braking force simply by detecting the change in the roll length. Thus, it is possible to adjust the sheet tension to an optimum level for each stage by controlling the braking force according to the roll diameter.

The third method according to this invention comprises carrying out a special mode before a normal mode in which the tension in the sheet is adjusted while the sheet is being fed, the special mode including calculating the paper winding length of the roll based on the signals from the sheet length sensor and the angle sensor in the same manner as in the normal mode by an inching operation in which the sheet is intermittently fed by a predetermined length, and adjusting the braking force to an intermediate level before the start of the normal mode based on the roll diameter calculated from the paper winding length to adjust the tension in the sheet beforehand. Advantages of this arrangement are set forth in the description of the embodiments.

Any deviation in position between the roll support cylinder and the paper roll detachably mounted on the roll support cylinder is detected in the normal mode and/or the special mode based on an inconsistency between the signal from an angle sensor provided between the roll support cylinder and a support plate of the support shaft for detecting the rotation angle of the roll support cylinder and the signal from the angle sensor provided between the paper roll and the support shaft for detecting the rotation angle of the paper roll.

Other features and objects of the present invention will become apparent from the following description made with reference to the accompanying drawings, in which:

DETAILED DESCRIPTION OF THE PREFERRED EMBODIMENT

Figure 1:
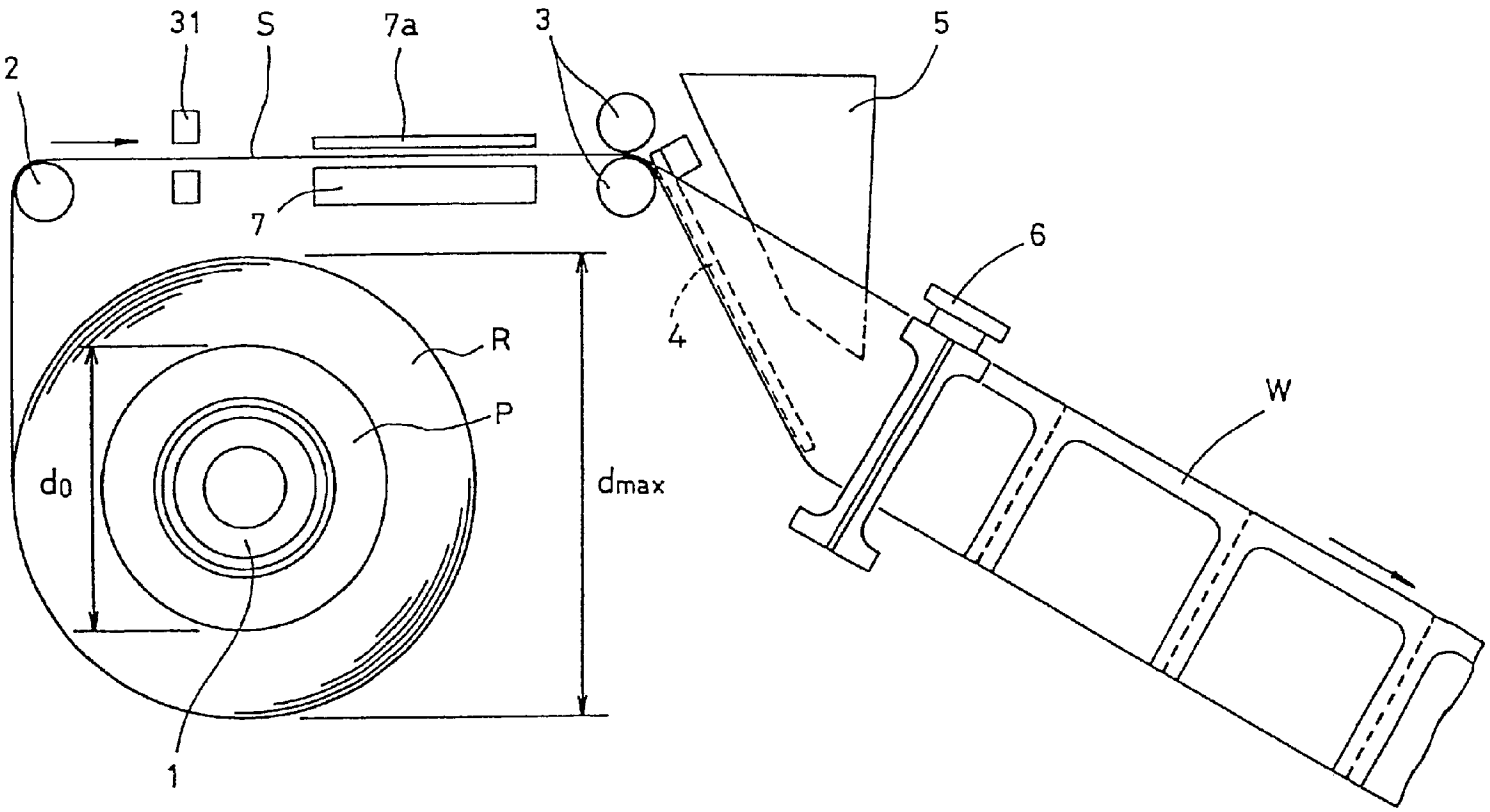
FIG. 1 is a partial schematic view of a paper feed unit and a packaging unit of a packaging device.

Embodiments of this invention are described with reference to the drawings. FIG. 1 is a schematic diagram of a drug packaging machine, showing mainly a paper feed unit and a packaging unit. The paper feed unit has a support shaft 1 on which is rotatably mounted a core pipe P on which is wound a roll R of a drug packaging paper sheet S. The sheet S is unwound from the roll R, and fed through feed rollers 2, 3 to the packaging unit.

In the packaging unit, the sheet is longitudinally folded in half by a triangular plate 4. Drugs are dropped into the space defined in the folded sheet. The sheet is then heat-sealed widthwise and along both side edges at predetermined intervals by heating rollers 6 provided with perforators. While the packaging unit includes numerous other parts, only essential parts are shown for simplicity.

Figure 2:
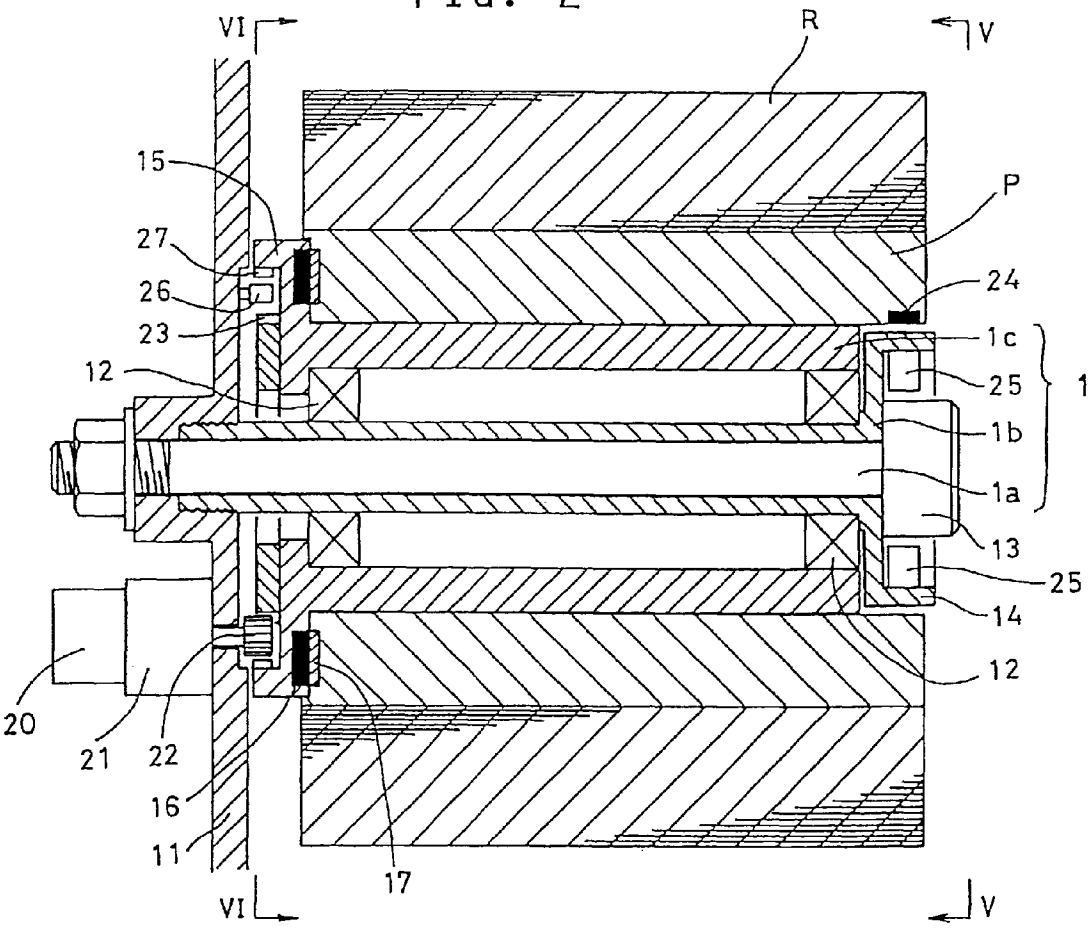
FIG. 2 is a vertical sectional view of the paper feed unit with a roll of paper mounted thereon.

FIG. 2 is a partial vertical section of the paper feed unit in which the roll of paper R and the core pipe P are set. As shown, the support shaft 1 comprises a center shaft 1a having one end thereof fixed to a support plate 11 by a nut, an outer shaft 1b integrally mounted around the center shaft 1a, and a hollow shaft 1c rotatably mounted on the outer shaft 1b through bearings 12 provided near both ends of the outer shaft 1b.

The center shaft 1a has a shaft head 13 at one end. The outer shaft 1b has a flange 14 at the same one end. The hollow shaft 1c has a flange 15 at the other end. The ore pipe P and the roll of paper R, mounted on the hollow shaft 1c, are rotatable relative to the outer shaft 1b. A plurality of magnets 16 are provided on the inner peripheral surface of the flange 15 at suitable intervals. Ferromagnetic (iron) members 17 are provided along the circumference of an end face of the core pipe P. The magnets 16 attract the ferromagnetic members 17 so as to detachably mount the core pipe P and the roll paper R on the hollow shaft 1c.

Packaging sheet S, when unwound from the roll of paper R, is suitably tensioned by a motor brake 20 engaging the hollow shaft 1c. The motor brake 20, mounted on the support plate 11, is connected to a gear unit 21 through a transmission belt, not shown. The gear unit 21 has an output shaft on which is mounted a pinion 22 in mesh with a large gear 23 provided on the outer peripheral surface of the flange 15. Thus, by activating the motor brake 20, braking force is applied to the hollow shaft 1c.

The motor brake 20 is a small AC motor powered by a DC voltage. As will be described below, braking force is variable in four stages according to the tension in the packaging sheet S being unwound by changing the DC voltage applied in four stages.

Magnets 24, Hall element sensors 25, a proximity switch 26 and projections 27 are described in the second embodiment.

Figure 3:
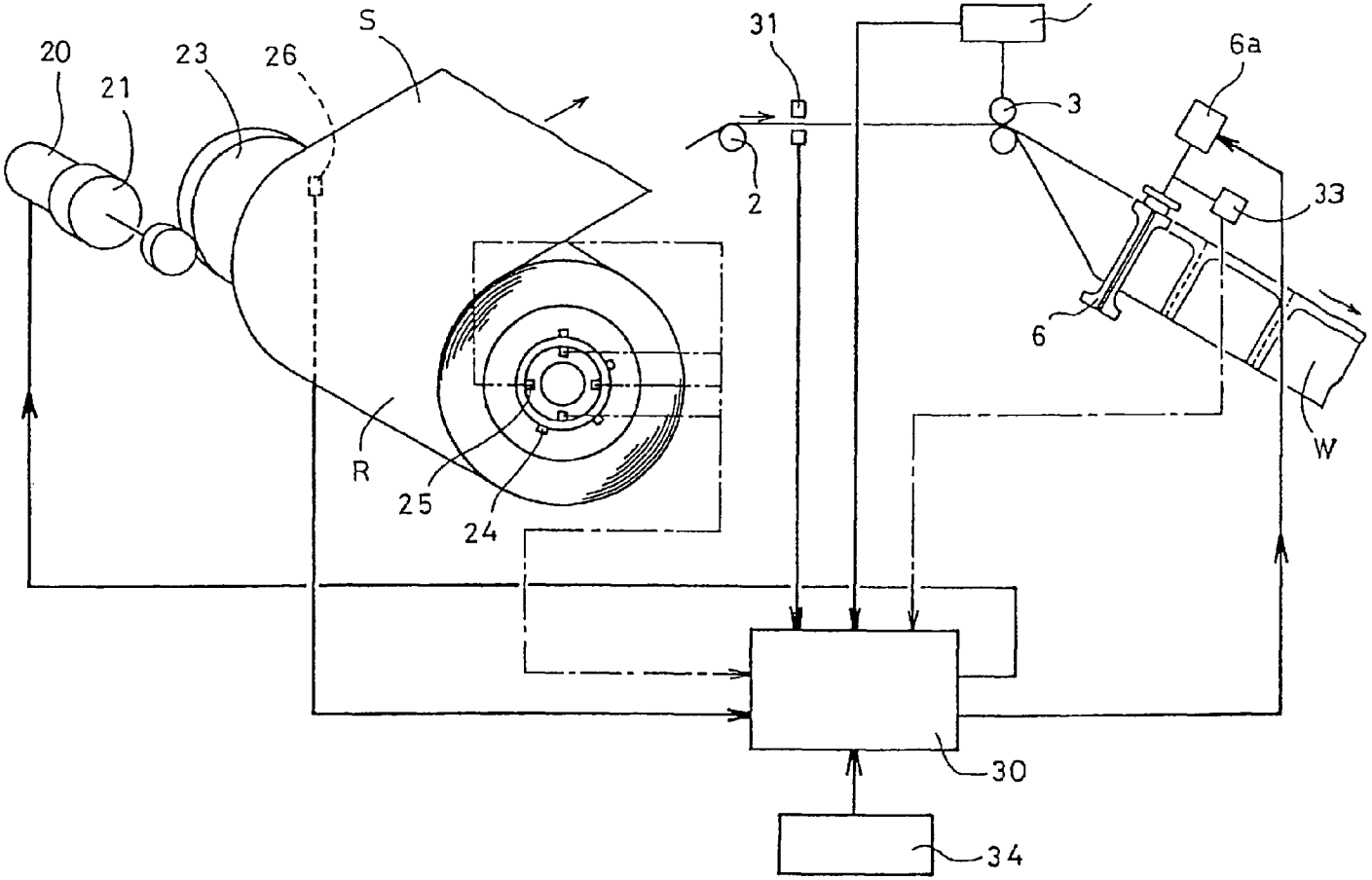
FIG. 3 is a schematic block diagram of a control circuit of a tension adjusting device for a packaging sheet.

FIG. 3 schematically shows a brake circuit for controlling various parts of the device for feeding packaging sheet from the paper feed unit and packaging drugs. A control unit 30 receives signals from an end sensor 31, those from a rotary encoder 32 provided near the feed rollers 3, and those from a revolving speed counter 33 mounted on the output shaft of a motor 6a coupled to the shaft of one of the heating rollers 6, and produces, based on one of the above signals, outputs for activating the motor brake 20 or the motor 6a. Numeral 34 indicates an input unit for inputting external data.

Drugs are packaged while adjusting the tension in the packaging sheet with the sheet tension adjusting device of the first embodiment.

In the first embodiment, the maximum diameter dmax and the minimum diameter do of the roll of paper R, which are to be set in the paper feed unit, are known beforehand. Braking force produced by the motor brake 20 is varied in four stages according to the signal from the rotary encoder 32 to apply suitable tension to the sheet by adjusting the braking force according to the changing diameter of the paper roll R.

The roll paper R shown has a maximum diameter dmax=160 mm, minimum diameter d0≈64 mm, and sheet thickness γ=30 μm. In this case, braking force produced by the motor brake is varied every time the diameter of the paper roll R decreases (160−64)/4=24 mm.

The length of the sheet forming a roll R of a given diameter is given by the following formula:

$$\begin{aligned} L &= [(d_0 + 2\times\gamma) + (d_0 + 2\times 2\gamma) + \ldots + (d_0 + 2\times(n-1)\gamma + (d_0 + 2\times n\gamma)]\pi \quad (1) \\ &= [nd_0 + 2(1 + 2 + \ldots + n - 1 + n)\gamma]\pi \\ &= \left[nd_0 + 2\times\frac{n(n+1)}{2}\gamma\right]\pi \\ &= [d_0 + (n+1)\gamma)]n\pi \end{aligned}$$

(wherein n is the number of turns)

The diameter of the roll R is given as follows:

$$dmax=d0+2\times n\gamma \quad (2)$$

From Formula (1), the length Lmax of the sheet forming the roll R when the roll diameter is maximum is:

$$Lmax=[64\times n+n(n+1)\times 30n\times 10^{-3}]\pi$$

From Formula (2), $dmax=64+2\times 30n\times 10^{-3}=160$ (mm)

Thus, $n=96/6\times 10^{-2}=1600$

Hence, $Lmax=(64+1601\times 30\times 10^{-3})\times 1600\pi=562{,}688$ (m)

Now, let the diameter range of the roll of paper divide into four stages N=1 (largest), 2 (second largest), 3 (third largest) and 4 (smallest). The maximum sheet length of the roll in each stage is given by the following formulas:

where N=1, Lmax=562,688 (m), (n=1600, dmax=160)

where N=2, Lmax=376,800 (m), (n=1200, dmax=136)

where N=3, Lmax=221,056 (m), (n=800, dmax=112)

where N=4, Lmax=95,456 (m), (n=400, dmax=88)

The control unit 30 receives the signal from the rotary encoder 32 to measure the length of packaging sheet S to the feed rollers 3 and determines which one of the stages 1-4 the diameter of that the roll R is in. Then, the control unit determines the DC voltage to be applied to the motor brake 20 so that an equal tension is applied to the sheet for all the stages 1-4. For example, the DC voltage is determined as follows:

where N=1, V=25V where N=2, V=16V where N=3, V=12V where N=4, V=8V

Figure 4:
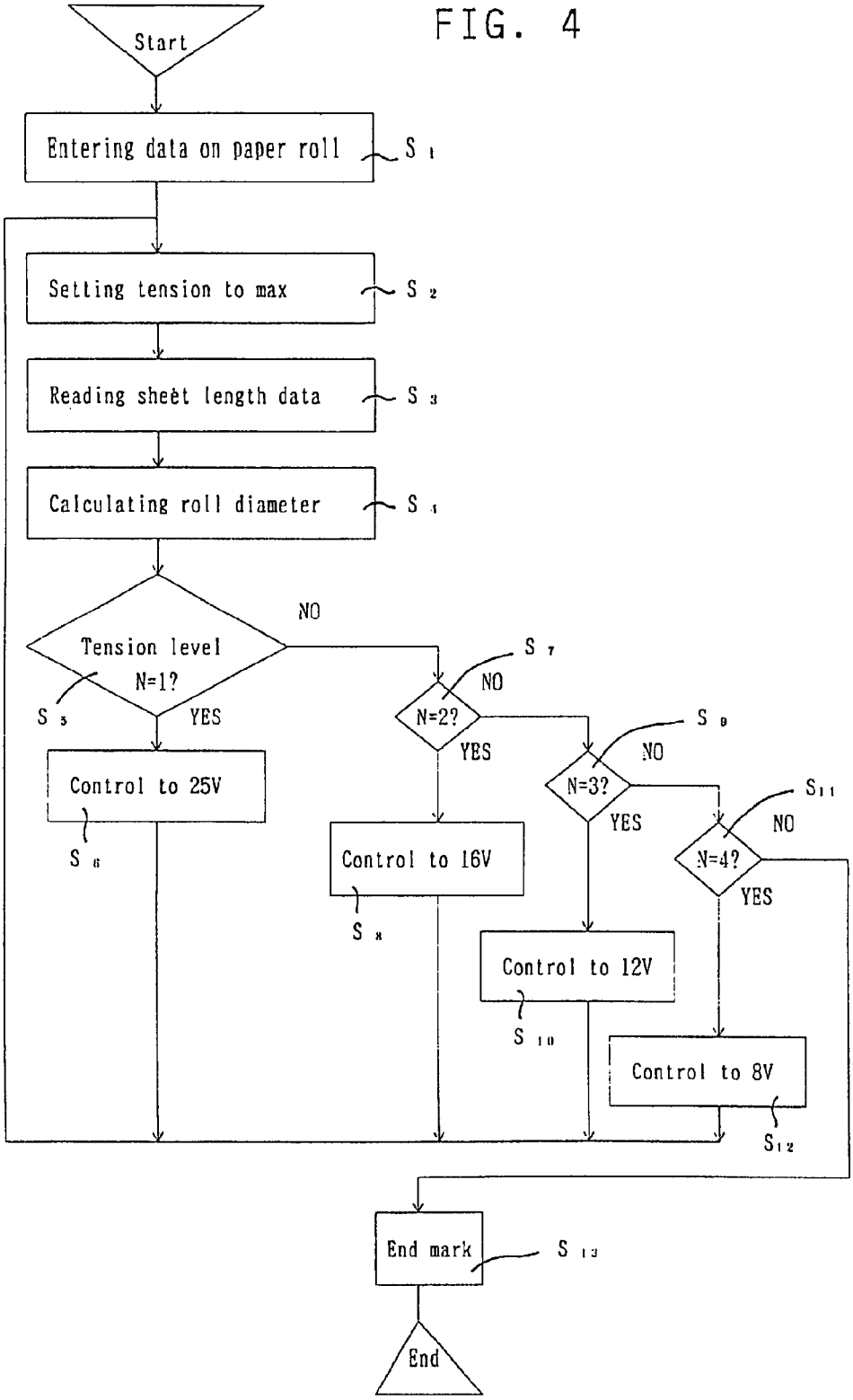
FIG. 4 is a flowchart illustrating the operation of a tension adjusting device of a first embodiment.

Referring now to the flowchart of FIG. 4, this method is described more specifically.

First, as shown in FIG. 1, the packaging sheet S is slightly unwound from the paper roll R to a point at least downstream of the heating rolls 6 and sandwiched between the heating rolls 6 so that the sheet can be heat-sealed by the heating rolls 6.

In this state, the control unit is started. In Step S1, data on dimensions of the paper roll R is entered through the input unit 34. Such data, that is, data on the completely wound paper roll R may be stored in the input unit 34 beforehand and fed to the control unit when a signal on an end product is entered. otherwise, necessary data may be entered through a keyboard every time such data are needed. The latter method is advantageous when a half-used paper roll R is reset. When these data are entered, the control unit 30 begins to control the computation and feed the packaging sheet S. In Step S2, a maximum DC voltage is applied to feed the packaging sheet S with its tension kept at the maximum.

In Step S3, a signal on the sheet length data is read. In this embodiment, this signal is the signal from the rotary encoder 32 and is inputted from every processing cycle in each of the steps described below.

In Step S4, based on the input signal, the control unit calculates the number by which the turns of the paper roll has decreased from the maximum diameter until the above signal is inputted, and based on this number, calculates the remaining the sheet length of the paper roll and its diameter at this moment, using the formulas (1) and (2). In Step S5, based on the thus calculated remaining sheet length of the paper roll, the tension level is determined.

That is, in Step S5, the control unit 30 determines, based on the remaining sheet length of the roll, which one of the stages 1-4 that the diameter of the paper roll R is in. If the diameter of the roll is in stage N=1, a predetermined DC voltage for tensioning the sheet S to the maximum level is applied to the motor brake 20 in Step S6.

If N≠1, the control unit determines if N=2 in Step S7.

If N=2, a DC voltage of 16 V is applied to the motor brake 20 in Step S8. If N≠2, the control unit determines if N=3 in Step S9. If it is, a DC voltage 12 V is applied in Step S10. If not, the control unit determines if N=4 in Step S11. If it is, a DC voltage 8 V is applied in Step S12.

The above operation is carried out for every cycle in the processing loop. If N≠4 in step S11, which means that the packaging sheet S has been unwound completely, the control unit stops the feed of sheet S after confirming the signal from the end sensor 31 in Step 13. This completes the entire control.

In this embodiment, the signal from the rotary encoder 32 is used to measure the sheet length and control the motor brake 20 based on the sheet length. But instead, the sheet length may be measured by use of signal from a sensor provided on the support shaft 1 of the paper feed unit for detecting the rotary angle of the paper roll R. This sensor is used in the second embodiment.

In the first embodiment, it is assumed that the sheet has a thickness of 30 μm. But actually, while the sheet is being fed, it is stretched due to the tension applied to the sheet. Thus, the sheet thickness is usually smaller while being fed than while in a stationary state. Thus, the sheet thickness while the sheet is being fed should be determined by reducing the sheet thickness in a stationary state by a certain rate which is estimated based on average elongation of the sheet while being fed.

Figure 5:
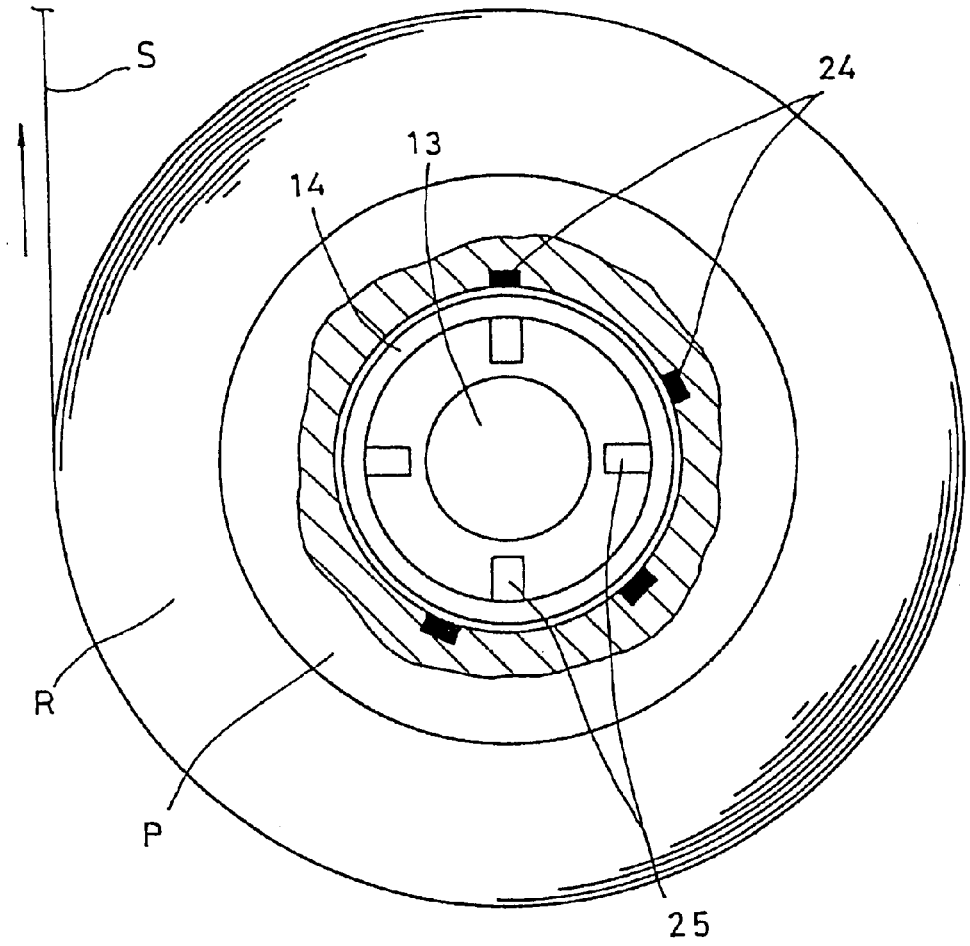
FIG. 5 is a side view of a paper feed unit of a second embodiment as, viewed in the direction of arrow V-V of FIG. 2.

FIG. 5 and the subsequent figures show the second embodiment, which is of basically the same construction as the first embodiment but includes additional elements so that the sheet tension can be controlled with higher accuracy.

The paper feed unit and the packaging unit of this embodiment are those shown in FIGS. 1-3. This embodiment differs from the first embodiment in that, as shown in FIG. 3, the control unit 30 receives the signals from a rotary angle sensor assembly comprising four magnets 24 and four Hall element sensors 25, and a sheet displacement sensor comprising a proximity switch 26 and projections 27 (see FIGS. 2 and 5).

Specifically, the control unit accurately calculates the length of the sheet S unwound from the paper roll R based on the sheet length sensor signal of the first embodiment and the signal from the rotation angle sensor, and adjusts the braking force corresponding to the variation in diameter of the roll R to adjust the tension applied to the sheet.

Figure 7:
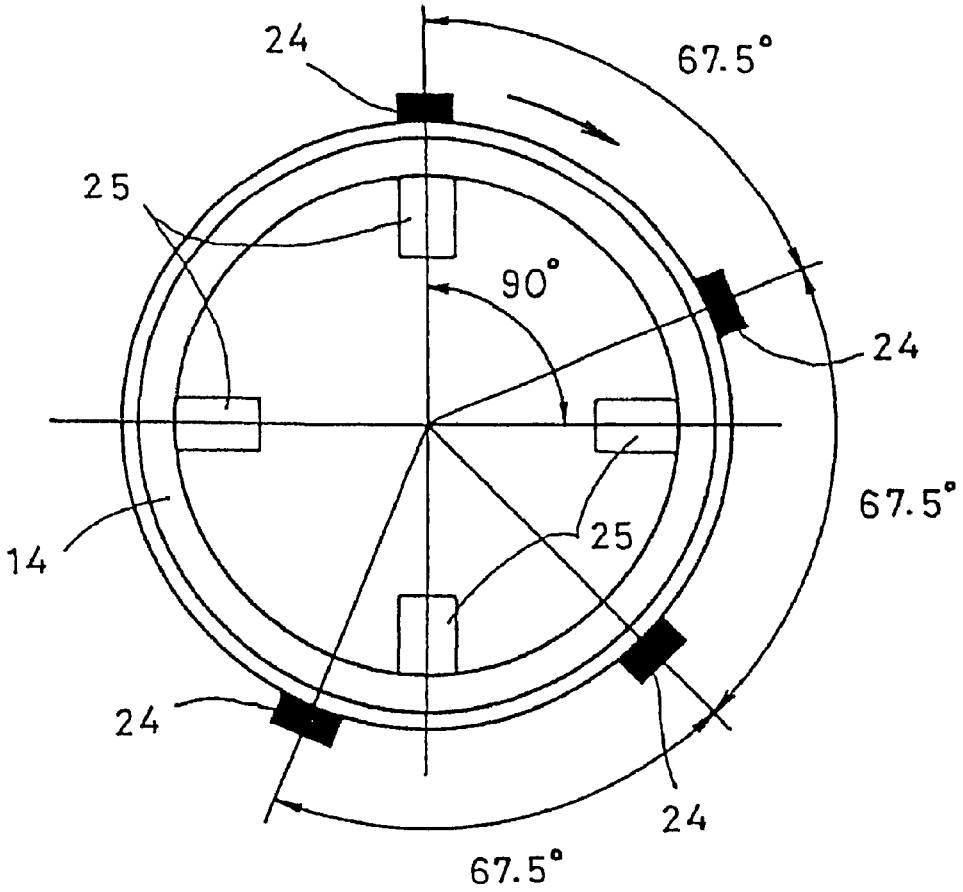
FIG. 7 is a schematic view of an angle sensor of a tension adjusting device of a second embodiment.
Figure 8A:
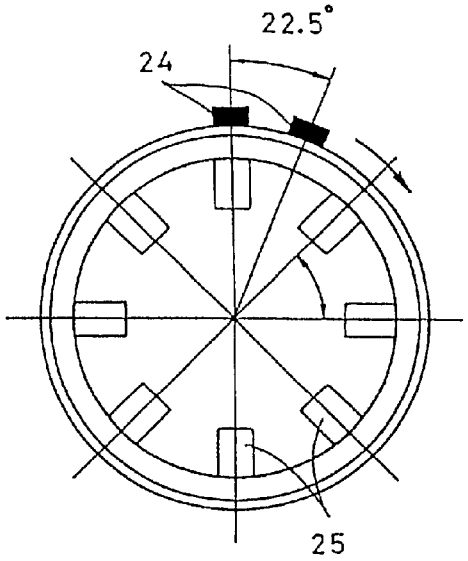
FIGS. 8A-8D are schematic views of different types of angle sensors.
Figure 8B:
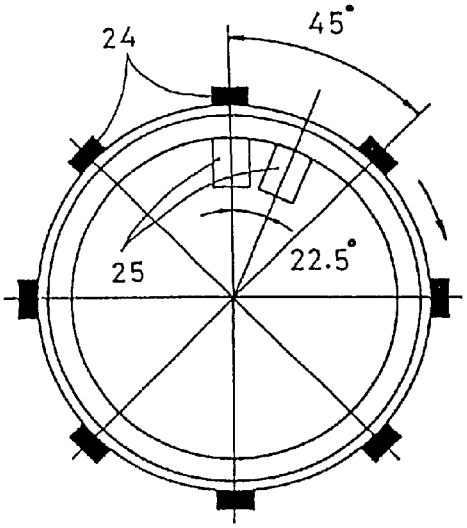
Figure 8C:
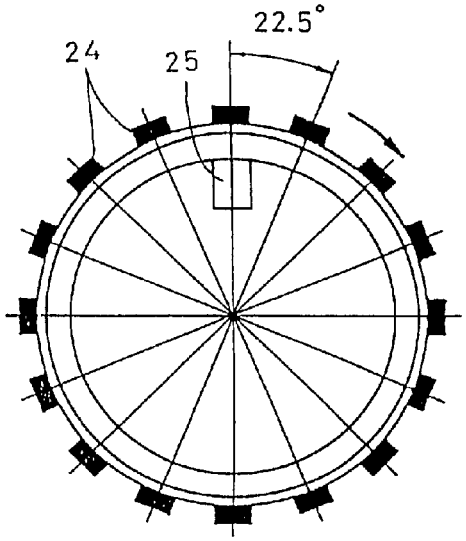
Figure 8D:
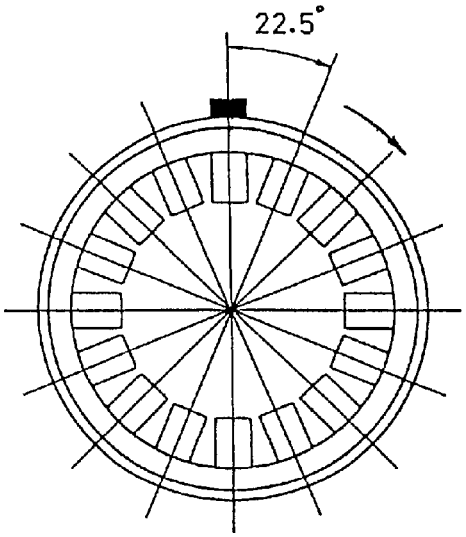

As shown in FIG. 7, the four magnets 24 of the second embodiment are provided on the inner peripheral surface of the core pipe P at angular intervals of 67.5° around the axis of the pipe P, while the four Hall element sensors 25 are provided at one end of the support shaft 1 at equal angular intervals of 90° around the axis of the pipe P.

The numbers and positions of magnets 24 and sensors are however not limited to those shown in FIG. 7. FIG. 8 shows some variations of their numbers and arrangement. In any variation, the Hall element sensor or sensors 25 produces a pulse signal every time the core pipe P rotates 22.5°.

Also, instead of the combination of magnets 24 and Hall elements 25, photosensors may be used to detect the rotation of the core pipe P. Such photosensors comprise light emitting diodes and light interceptors and are fixed to one end of the support shaft 1 (outer shaft 1b) as with the Hall elements 25.

More particularly, such photosensors are mounted on an extension or mounting seats provided on the flange end of the outer shaft 1b, while projections are provided on the core pipe P at angular intervals of 22.5° so as to pass between the light emitting diodes and the light interceptors of the photosensors. The numbers of the photosensors and the projections are the same as the Hall element sensors 25 and the magnets 24.

Figure 6:
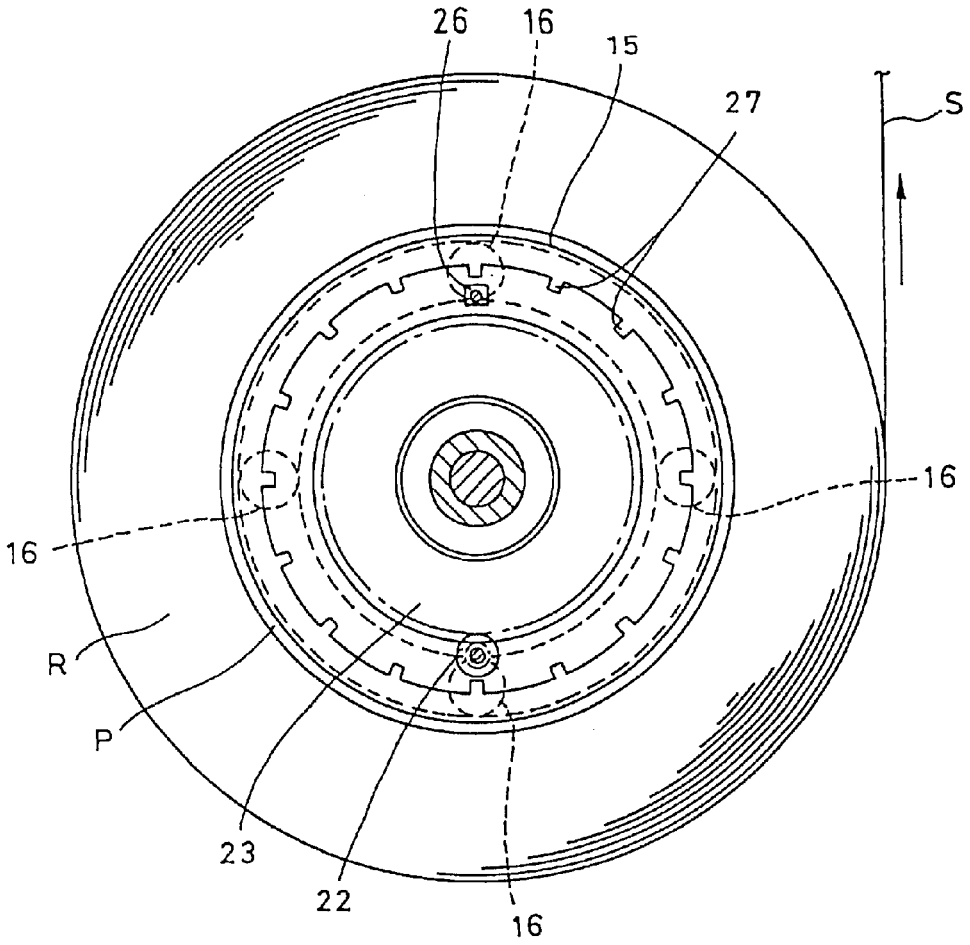
FIG. 6 is a side view of the paper feed unit of the second embodiment as viewed in the-direction of the arrow VI-VI of FIG. 2.

FIG. 6 is a side view as viewed in the direction of arrow VI-VI of FIG. 2, and mainly shows the position of the displacement detection sensor for the packaging sheet. In this example, a single proximity switch 26 is provided on the support plate 11. Sixteen projections 27 are provided on the flange 15 of the rotatable hollow shaft 1c of the support shaft 1.

If there is a difference in pitch between the rotation angle sensor signal detected by the Hall element sensors 25 and the signal detected by the displacement detection sensor, the control unit determines that there is a displacement.

Figure 9A:
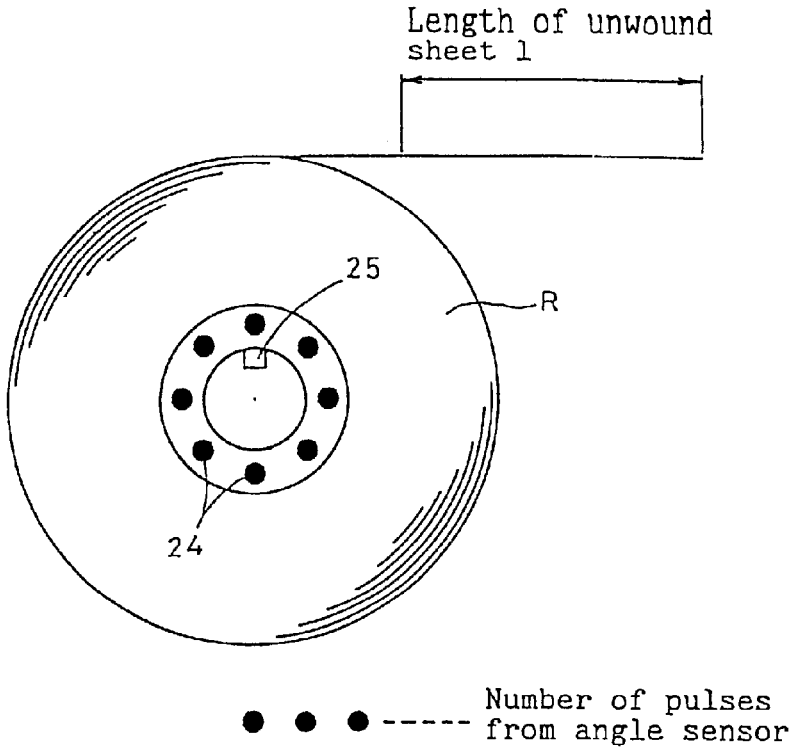
FIGS. 9A and 9B are views showing basic function of the tension adjusting device of the second embodiment.
Figure 9B:
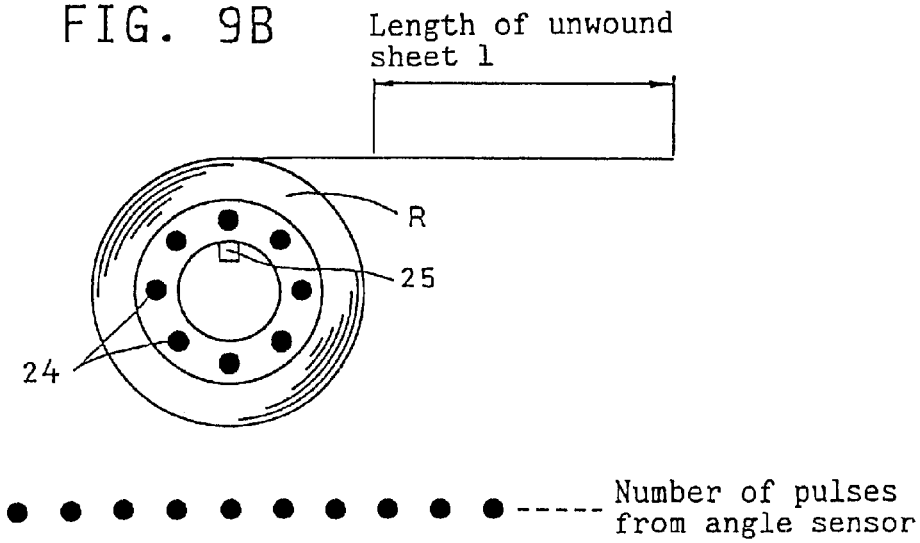

Now the operation of the second embodiment is described. As shown in FIGS. 9A, 9B, this operation basically comprises determining the length of sheet forming the paper roll based on the total length 1 of the unwound sheet calculated from the sheet length signal produced by the rotary encoder 32, and the angle θ calculated from the pulse signal from the Hall element sensors 25 as the angle sensors.

In FIGS. 9A, 9B, for the convenience of the description of operation, the number and arrangement of magnets 24 and Hall element sensors 25 are different from those of FIGS. 7 and 8. But its basic operation is the same in that one pulse signal is produced for every 22.5° rotation.

As shown FIG. 9A, when the radius of the paper roll is large, the angle sensor produces fewer pulses while the packaging sheet is unwound by the length 1. As the paper roll radius decreases as shown in FIG. 9B, the number of pulses increases. If the pulse numbers when the paper roll radius is at its maximum and minimum is 3 and 10, respectively, the range of pulse numbers from 3-10 are divided into four stages so as to apply D/C currents that can apply suitable tension corresponding to the respective stages to the motor brake 20 to adjust the braking force.

There is the following relationship between the above tension level N=1-4 and the pulse number. Provide the maximum and minimum diameters of the paper roll R are 160 mm and 64 mm, respectively, the length of the sheet unwound from the roll when the roll diameter is maximum will be π×160 mm. Since the angle sensor 25 produces one pulse signal for every 22.5° rotation (16 pulses for every full turn), the sheet is unwound by π×160/16=314 m/m. For the unwound length of 3140 m/m, the pulse number will be 10.

When the roll diameter is minimum, there is the following relation between the length of sheet unwound and the pulse number. That is, since π×64/16=129.5 m/m, for the unwound length of 3140 m/m, the pulse number will be 3140/1295×10=24.2.

The pulse number and the DC voltage for every tension level N are determined as follows:

| Tension Level N | Pulse Number | DC Voltage |
|---|---|---|
| N = 1 | 10-13 | 25V |
| N = 2 | 14-17 | 16 V |
| N = 3 | 18-21 | 12 V |
| N = 4 | 22-24.2 | 8 V |

Figure 10:
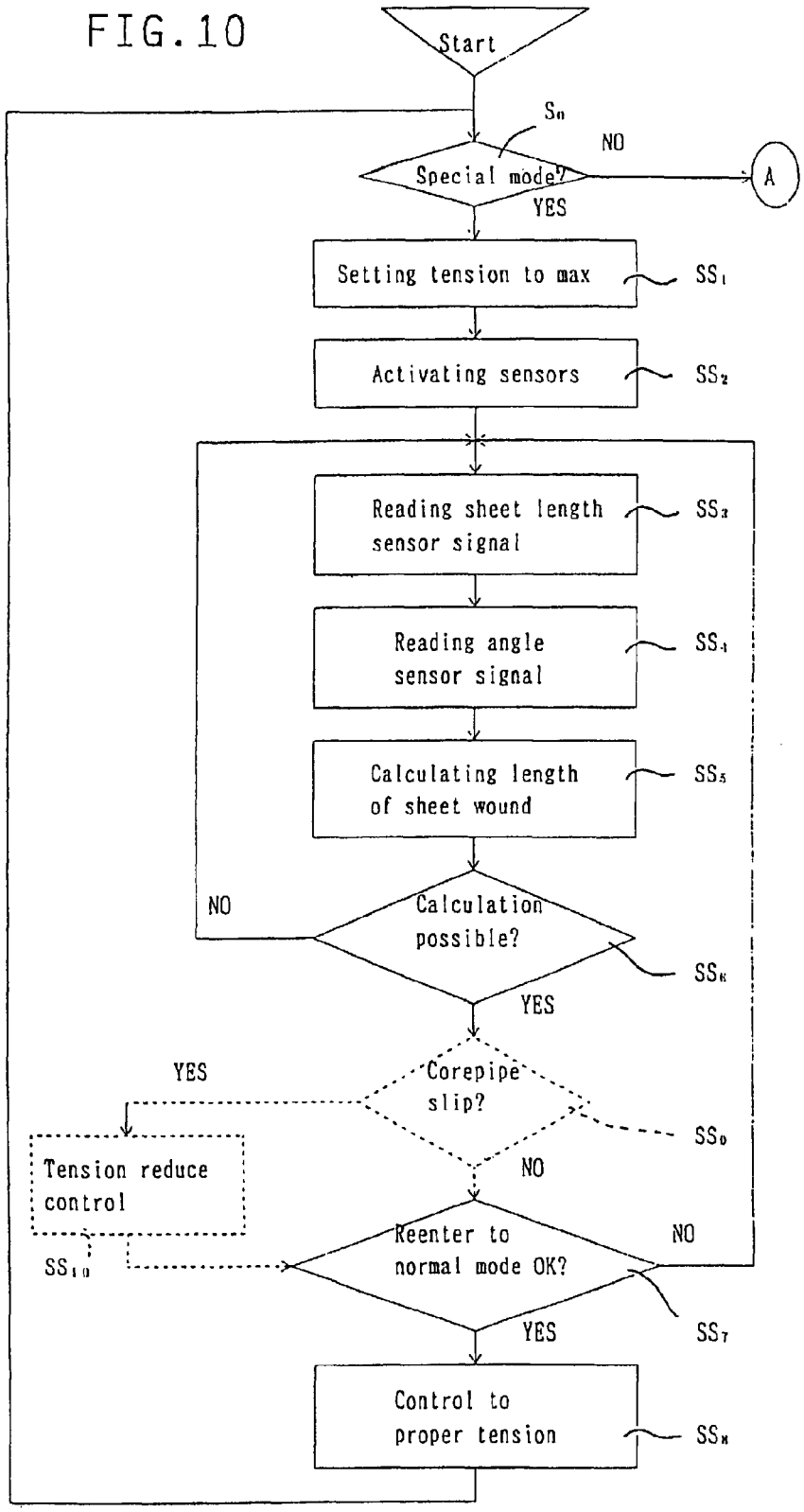
FIG. 10 is a flowchart showing a special operation mode of the tension adjusting device of the second embodiment.
Figure 11:
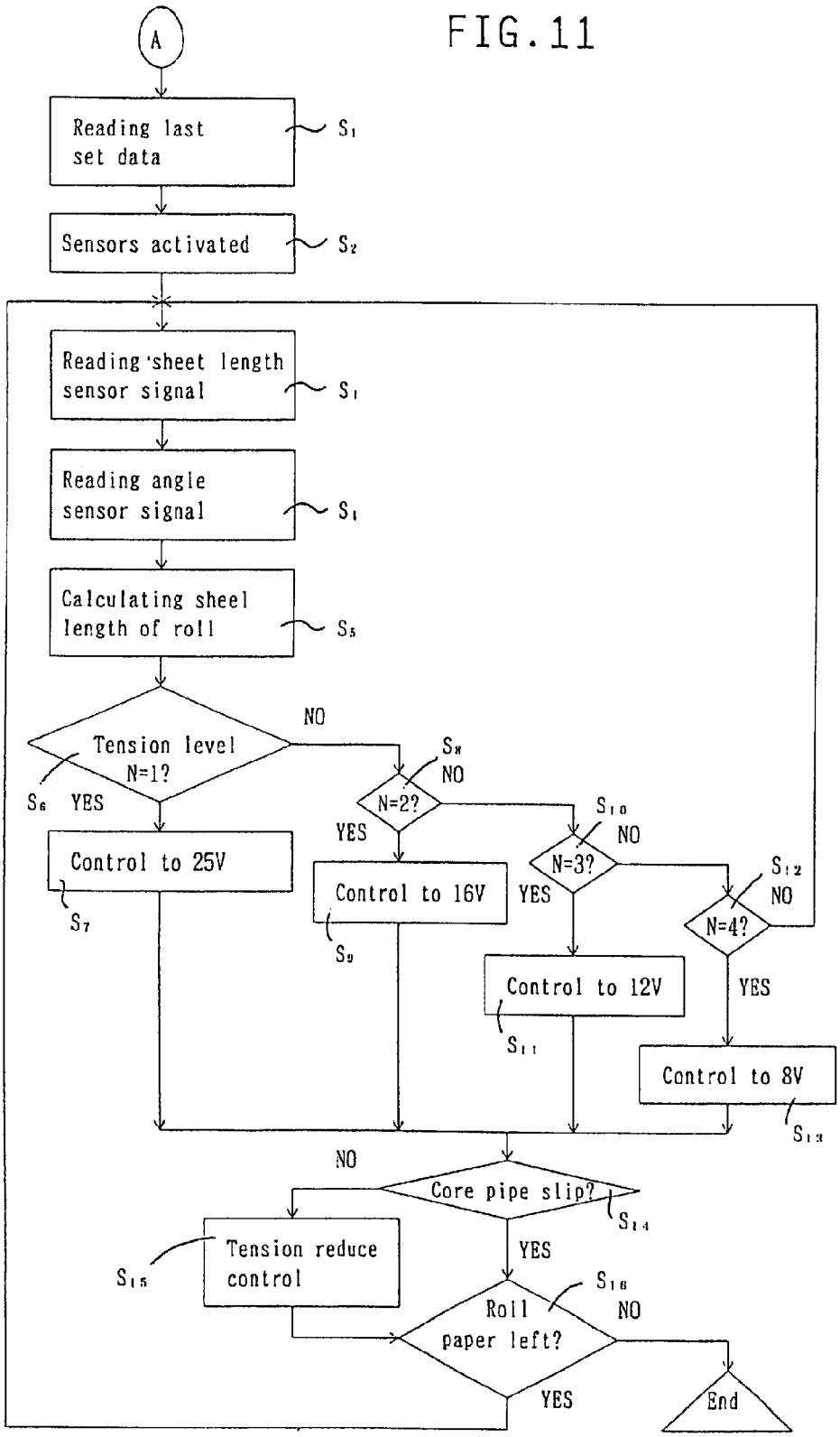
FIG. 11 is a flowchart showing a normal operation mode thereof.

In the above description, the tension level N is adjusted according to the pulse number for a given unwound length of sheet. But the tension level may be determined based on the unwound length of sheet when a predetermined number of pulses have been produced. More detailed description of this method follows:

FIGS. 10 and 11 are flowcharts showing the operation of the tension adjusting device. Specifically, FIG. 10 is a flowchart of a special mode to be carried out before the normal mode of the tension adjusting device. FIG. 11 is a flowchart of the normal mode.

In the special mode shown in FIG. 10, the control unit checks various conditions for the normal packaging operations in the packaging unit so that the normal mode can be carried out smoothly. Before the normal packaging operation, packaging sheet has to be correctly set in the packaging unit. The packaging sheet is usually set manually by inching. The control mode passes this special mode.

In Step S0, the control unit determines if the current mode is the special mode. The special mode starts if any one of the following conditions is met: i.e. the actuation of the end sensor or joint seal, and the detection of inching mode or reverse rotation of the winding length sensor. The joint seal is activated while one paper roll has run out and a new roll is being set and spliced to the preceding sheet.

The inching mode starts by switching on the control unit before the start of all of the operations, and the packaging sheet is manually set in the above-described manner.

The special mode is necessary because a new, complete paper roll is not always set but there is the possibility that a used roll paper having e.g. half the diameter of a new roll may be set. If the roll set has only half the diameter of a new paper roll, the tension is initially adjusted to an intermediate level smaller than the tension corresponding to the diameter of the new roll.

If the current mode is judged to be the special mode in Step S0, the tension is set at the maximum level in Step SS1, and various sensors (reference sensor, rotation number counter, winding length sensor, core pipe slip sensor) are activated (Step SS2). In this state, the packaging sheet is fed little by little by manual inching, and the signals from the sheet length sensor or rotary encoder 32, and the angle sensors or Hall element sensors 25.

In Step SS5, the control unit calculates the sheet length of the paper roll based on these signals using the above-described formulas to determine whether the roll has the maximum diameter or not, e.g. half the maximum diameter. If this calculation is not possible (NO), Step SS3 is carried out again. If possible, the control unit determines in Step SS7 if the conditions for reentering the special mode are all removed. If they are, the tension is adjusted to a suitable level in Step SS8. Steps SS9 and SS10 are steps for detecting slipping of the core pipe, which will be described later.

During tension adjustment in Step SS8, a DC voltage corresponding to maximum tension is set at 25 V if the paper roll has a maximum diameter (new) and at about 20 V if the paper roll diameter is about half the maximum diameter to prevent any abrupt change in tension.

When the tension has been adjusted to a suitable level, the program returns to Step S0 to determine whether or not to carry out the special mode operation again. This time, the program proceeds to the normal mode [A].

In the normal mode shown in FIG. 11, an inching mode switch is manually changed over, and then in Step S1, the previously set data is read out, and the various sensors are kept turned on (S2). By this time, the normal operation of the packaging unit has started. At the start of the normal operation, the tension is controlled to the DC current value suitably set in the special mode.

Figure 12:
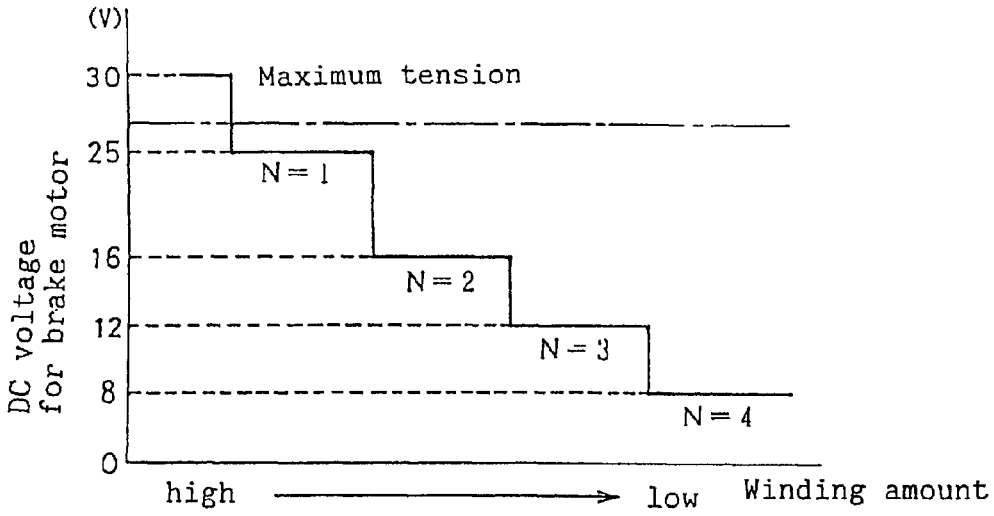
FIG. 12 is a graph showing the relationship between the DC voltage applied and the winding length during the special mode.

Then in Steps S3, S4 and S5, the sheet length signal and angle sensor signal are inputted in the same manner as in the special mode to calculate the sheet length of the roll. This calculation is carried out substantially in the above-described manner. If, as a result of calculation, the roll R turns out to be an unused, full-volume roll, the DC voltage is set at 25 V, 16 V, 12 V or 8V in Step S7, S9, S11 or S13 according to the judgment in Steps S6, S8, S10 and S12, in the same way as in the first embodiment. FIG. 12 shows the relationship between the above-described winding length and the DC voltage control.

After the tension control has been carried out via any of the abovementioned routes, the control unit determines if the core pipe is slipping in Step S14 based on the signal from the proximity switch 26. As shown in FIG. 6, the switch 26 is provided opposite to the 16 ferromagnetic projections, and produces a pulse signal every time the core pipe rotates 22.5° in exactly the same manner as the Hall element angle sensors 25.

Figure 13:
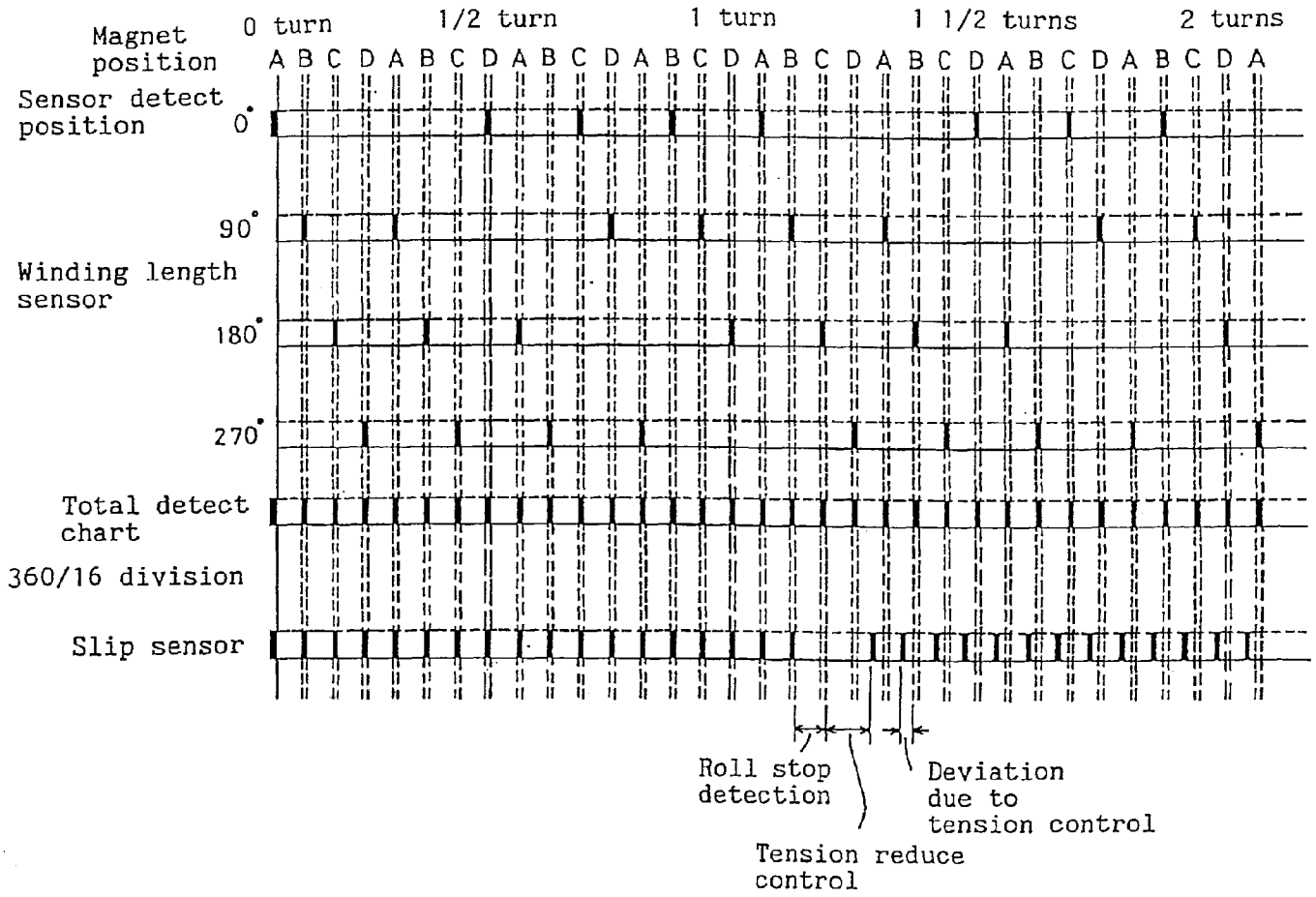
FIG. 13 illustrates how a slip detection sensor detects slipping.

In the embodiments, the angle sensors 25 and 26 are different types, but they may be of the same type. The time chart of FIG. 13 shows the relationship between the pulse signals produced by the angle sensors and the rotation angle. As shown, the pulse signals by the slip detection sensor can be obtained synchronously with the pulse signals by the winding length detecting sensor unless the winding condition changes with tension.

But if the rotation resistance of the motor brake 20 produced by each of the above-described DC voltages is inappropriate, for example, if the tension is too large at the tension level N=2, the paper roll R will rotate strongly together with the core pipe P. This may cause a shift in the position where the ferromagnetic members 17 are attracted to the magnets 16. If this happens, although the Hall element sensors 25 keep producing pulse signals at regular angular intervals of 22.5°, the proximity switch 26 may produce two pulse signals simultaneously and fails to produce a signal when the core pipe rotates another 22.5°.

FIG. 13 shows how pulse signals change when such a position shift occurs. As shown, the slip detection sensor fails to produce pulse signals at positions C and D after the core pipe has made a complete turn. Instead, pulse signals are produced between D and A with some displacement.

In such a case, the control unit can determine that the slip detection sensor has failed to produce a pulse signal at position C by referring to the signal from the winding length detection sensor. If, for example, the DC current of 16 V is too high at the level N=2, so that the tension is too high, the voltage may be reduced to 14 V to adjust the tension to a suitable level. With this voltage adjustment, a pulse signal can be produced at any desired position after position D.

After adjusting any position shift of the core pipe P due to sheet tension variation, the control unit checks in Step S16 if paper is still wound on the pipe P based the signal from the end sensor 31. If the sensor 31 has not yet detected the terminal end of the paper, the Step S3 operation is carried out, that is, the sheet tension is controlled according to the winding length of the paper roll by repeating the above calculations.

The tension control mode ends when the end sensor 31 detects the terminal end of the packaging sheet S. If it is necessary or desired to continuous packaging thereafter, the program returns to the special mode to replace the roll R with a new one and connect the sheet ends.

Steps SS9 and SS10 are shown by chain lines in the flow chart for the special mode, which means that these steps are not essential. If provided, though, their functions are the same as Steps S14, S15 in the slip detection operation in the normal mode.

The above description has been made on the assumption that the paper roll R is a full-volume roll. If a roll about half the maximum diameter is set in the paper feed unit, after the tension has been adjusted in the special mode to a level slightly larger than the tension during the normal mode when the full-volume roll is unwound to about half the maximum diameter, the normal mode is started. It is thus possible to smoothly start the normal mode without the possibility of an abrupt rise in tension.

In the description of the first and second embodiments, we have described the sensor assembly comprising the proximity switch 26 and projections 27 as a sensor for detecting "slip" of the pipe P relative to the hollow shaft K. But this sensor assembly may be used as a substitute for the sensor assembly comprising the magnets 24 and Hall element sensor 25 as an angle detector sensor.

The former sensor assembly comprising the proximity switch 26 and projections 27 keeps outputting a pulse signal at the same timing as the angle detection by the Hall element sensor 25 as shown in FIG. 13, as long as no abnormal braking force is applied from the motor 20 (due e.g. to failure of the braking motor 20). Thus, it is possible to use this pulse signal as an angle detection signal.

If the proximity switch is used as an angle detection sensor, the Hall element sensor 25, which is used as an angle detection sensor, is unnecessary and can be omitted. In this case, the angle sensor including the proximity switch 26 acts both as an angle sensor and a slip detection sensor. In order for this sensor to act as a slip detection sensor, a reference signal is needed. Such a reference signal can be provided by the rotary encoder 32.

If abnormal braking force is applied form the braking motor 20, that is, if the motor 20 stops, the hollow shaft K and its flange 15 will stop. Slip thus occurs between the pipe P and the flange 15. If paper is being fed even slightly in this state, the rotary encoder 33 will produce a signal. Thus, the proximity switch 26 can detect that the pipe is slipping relative to the flange 15 from the fact that the pulse signal from the encoder 33 does not coincide with the pulse signal from the proximity switch 26.

As described above, according to the present inventions, the paper roll diameter corresponding to the current winding length of the roll is calculated based on data on the sheet feed length measured by the single sheet length sensor and data on the full winding length of the roll to adjust the sheet tension to an optimum level by controlling the braking force in a stepwise manner based on the paper roll diameter measured. Thus, it is possible to adjust the sheet tension to an optimum level by selecting the braking force in a stepwise manner corresponding to the roll diameter corresponding to the gradually decreasing winding length of the roll, unless the winding length of the roll begins to increase. It is thus possible to smoothly adjust the sheet tension without the possibility of abrupt tension fluctuations due to sudden fluctuations in braking force when the roll diameter changes slightly.

According to another aspect of the present invention, the current winding length of the roll is determined based on the change in the signal from one of the sheet length sensor and the angle sensor relative to the signal from the other sensor, and the sheet tension is adjusted by selecting a braking force corresponding to the diameter corresponding to the current winding length. In this arrangement, even if data on the full winding length is not known, it is possible to adjust the sheet tension by selecting a braking force corresponding to the roll diameter corresponding to the current winding length determined based on the measurement data. Thus, it is possible to smoothly adjust the sheet tension without the possibility of abrupt change in tension, in the same manner as in the first invention.

In the above embodiments, the angle detection sensor, shift detection sensor and winding length detection sensor (rotary encoder) are all used to determine the diameter of the winding. But it is also possible to detect that the sheet has been cut, using some of these sensors. This function is useful because the sheet tension adjusting device of each embodiment is used with a drug packaging device, and a sheet fed to the packaging device may be cut due to an excessive braking force applied thereto or due to the fact that one of the sheet rolls has run out of sheet.

In the second embodiment, the feed length is detected by the rotary encoder 32. Based on the feed length detected, the sheet length wound on the roll is calculated. Based on the winding length thus calculated, which is a pulse signal of the angle detection sensor or Hall element sensor 25, a winding radius is calculated to adjust the braking force. Also, the "shift" of the core pipe P relative to the flange 15 is detected by the proximity switch 26 as a shift detection sensor. The signals from these sensors can also be used to detect that the sheet has been cut, in the following manner. There are two cases in which the cutting of the sheet is detected.

In the first case, sheet is cut between the paper roll R and the rotary encoder 32. In this case, one or either of the angle detection sensor, which is the Hall element sensor 25 and the shift detection sensor, which is the proximity switch 26 is not producing pulse signals, while the rotary encoder 32 is producing a length measuring signal of the sheet feed length.

In this case, the control circuit 30 can determine that the sheet has been cut by the addition of a program for determining that the sheet has been cut. Based on this judgment, the control circuit 30 transmits a control signal to the motor 6a of the heating rollers 6 to stop the rollers 6, and also transmits a control signal to the feed device for feeding drugs to the packaging device to stop the feed of drugs. The fact that the sheet has been cut is displayed on a display (not shown).

In FIG. 3, the rotary encoder 32 is shown to be mounted on the shaft of a feed roller 3. The rollers 3 shown are a pair of rollers for feeding sheet by sandwiching it therebetween. One of the rollers is driven by a motor, not shown. The rotary encoder 32 is mounted on the shaft of the other roller 3 that is not driven. The unillustrated motor is driven synchronously with the motor 6a for the heating rollers 6. But it may be omitted, and the feed rollers 3 may be driven by the motor 6a through a belt.

The second case is the case where the sheet is not being fed at all. In this case, among the three detection sensors, one or either of the angle detection sensor and the shift detection sensor, and the sheet feed length detection sensor by the rotary encoder 32 are not producing signals at all, whereas the revolution number counter 33, shown in FIG. 3, can count the revolution number signal. In this case, it is possible to detect the cutting of the sheet by providing the judgment program so as to judge that the sheet has been cut. The control after the judgment that the sheet has been cut is the same as in the first case.

The rotary encoder 32 may be provided on the shaft of a feed roller 3 as shown, or on the shaft of the motor 6a for the heating rollers 6. The judgment programs are exactly the same for both of the abovementioned two cases. If the sheet is cut in either of the above two cases, the judgment program is provided so as to judge that the sheet has been cut if no signal is detected by one or either of the shift detection sensor and the angle detection sensor, while signals are detected by both the rotary encoder 32 and the revolution number counter 33. The control after the judgment that the sheet has been cut is the same as in the first case.

This embodiment is applied to the arrangement in which as shown in FIG. 2 the magnets 16 and ferromagnetic members 17 are provided between the core pipe P and the flange portion 15 of the hollow shaft 1c so that the core pipe P can shift relative to the hollow shaft 1c (flange 15). But this embodiment is applicable to the arrangement, too, in which instead of such magnetic fixing means, protrusions made up of integral magnets 16 and ferromagnetic members 17 are provided on the flange portion 15 (or on the core pipe P) so that the core pipe P cannot shift in the rotational direction relative to the flange portion 15. In this case, no shift detection sensor is provided because the core pipe P does not shift.

In this case, the proximity sensor 26 can be used as an angle detection sensor. Thus, this sensor or the angle detection sensor comprising the Hall element sensor 25 is used. In this example, even if the sheet is cut halfway or the sheet is not fed at all, no detection signal is produced by the angle detection sensor. Thus, depending on whether the rotary encoder 32 is mounted on the shaft of a roller 3 or the shaft of the motor 6a, the fact that the sheet has been cut is detected by the judgment program which judges that the rotary encoder 32 is or is not producing a signal while the rotation counter 33 is producing a signal.

The sheet cut detection function by means of various sensors and judgment program is necessary in a device of the type in which such data as the feed length of the sheet, winding length, winding diameter are temporarily stored in a memory (RAM), because if the device is stopped and turned off while sheet is being fed, interim data disappear and cannot be used at the restart.

By storing final results in an electrically erasable/programmable read only memory (EEPROM), the judgment results are not erased when reset, so that the device can be restarted correctly.

What is claimed is:

[~~1. A roll sheet assembly for use with a drug packaging device including a sheet feed unit comprising a fixed shaft, a first rotary shaft rotatably mounted around the fixed shaft and carrying said roll of sheet material, a first brake means for applying a braking force to the first rotary shaft, and feed rollers for feeding the sheet material from said roll, a second brake means for producing a constant braking force between the first rotary shaft and said roll of sheet material, a packaging unit comprising a triangular plate for folding the sheet material in half so as to form a valley in the sheet material, a hopper for dropping drugs into the valley formed in the sheet, and heating rollers for heat sealing the sheet material in a width direction at predetermined intervals and along top edges thereof to form a plurality of bags with the drugs sealed therein,~~

~~the sheet feed unit further comprising a sheet length sensor for measuring a feed length of the sheet in a sheet feed path leading to the packaging unit, a first angle sensor for detecting a rotation angle of said roll of sheet material, and a control unit for calculating a current sheet length on said roll of sheet material and the diameter of said roll of sheet material based on the sheet length measured by the sheet length sensor and the rotation angle measured by the angle sensor, and controlling a direct current voltage applied to the first brake means,~~

~~said roll sheet assembly comprising a cylindrical second rotary shaft having a cylindrical outer periphery and a cylindrical inner periphery, sheet material wound on said cylindrical outer periphery of said second rotary shaft, and at least one magnet provided on said cylindrical inner periphery of said second rotary shaft.~~]

[~~2. The roll sheet assembly as claimed in claim 1, wherein said at least one magnet comprises four magnets circumferentially spaced at equal intervals.~~]

[~~3. The roll sheet assembly as claimed in claim 1, wherein said magnet is detachably mounted on said inner cylindrical periphery of said second rotary shaft.~~]

*4. An assembly comprising:*

*a hollow core pipe having a predetermined length, said hollow core pipe comprising a cylindrical inner periphery and a cylindrical outer periphery;*

*a sheet of drug packaging paper wound around the cylindrical outer periphery of said hollow core pipe to form a sheet roll; and*

*a plurality of magnets provided on the cylindrical inner periphery of said hollow core pipe at circumferential intervals such that a sheet length and a diameter of the sheet roll can be calculated by an angle sensor provided on a fixed shaft,*

*wherein said plurality of magnets are provided such that the circumferential intervals are arranged in a way that detection of said plurality of magnets is carried out at equal angular intervals while said hollow core pipe makes one revolution, and said plurality of magnets are rotatable together with the sheet roll.*

*5. The assembly of claim 4, wherein the equal angular interval is 22.5°.*

*6. The assembly of claim 4, wherein the plurality of magnets comprises four magnets positioned at angular intervals of 67.5° around an axis of the hollow core pipe.*

*7. The assembly of claim 4, wherein the plurality of magnets comprises two magnets positioned at angular intervals of 22.5° around an axis of the hollow core pipe.*

*8. The assembly of claim 4, wherein the plurality of magnets comprises eight magnets positioned at angular intervals of 45° around an axis of the hollow core pipe.*

*9. The assembly of claim 4, wherein the plurality of magnets comprises sixteen magnets positioned at angular intervals of 22.5° around an axis of the hollow core pipe.*

* * * * *